United States Patent

Reed et al.

(10) Patent No.: US 8,939,368 B2
(45) Date of Patent: Jan. 27, 2015

(54) PORTABLE BAR CODE VERIFICATION READER

(71) Applicant: Label Vision Systems, Inc., Peachtree City, GA (US)

(72) Inventors: David Andrew Barnwell Reed, Peachtree City, GA (US); Timothy Francis Lydell, Peachtree City, GA (US)

(73) Assignee: Label Vision Systems, Inc, Peachtree City, GA (US)

( * ) Notice: Subject to any disclaimer, the term of this patent is extended or adjusted under 35 U.S.C. 154(b) by 88 days.

(21) Appl. No.: 13/849,110

(22) Filed: Mar. 22, 2013

(65) Prior Publication Data

US 2013/0256409 A1  Oct. 3, 2013

Related U.S. Application Data

(60) Provisional application No. 61/614,707, filed on Mar. 23, 2012.

(51) Int. Cl.
*G06K 5/00* (2006.01)
*G02B 26/10* (2006.01)
*G06K 7/10* (2006.01)
*G06K 7/14* (2006.01)

(52) U.S. Cl.
CPC .............. *G06K 5/00* (2013.01); *G06K 7/10881* (2013.01); *G06K 7/146* (2013.01)
USPC ...................................... 235/437; 235/462.25

(58) Field of Classification Search
USPC ................................. 235/437, 462.15, 462.25
See application file for complete search history.

(56) References Cited

U.S. PATENT DOCUMENTS 5,334,825 A * 8/1994 Maddox ........................ 235/437
2004/0046027 A1 * 3/2004 Leone et al. ............. 235/462.13

* cited by examiner

*Primary Examiner* — Daniel Hess
(74) *Attorney, Agent, or Firm* — Smith Gambrell & Russell LLP

(57) ABSTRACT

A new technology is provided for a portable bar code verification reader and is designed to create a video image of a bar code label in accordance to strict industry bar code verification standards. The barcode verification reader will effectively capture a bar code label and then send the resulting video image to a computer. The resulting bar code label quality may be displayed on the portable verification reader via one or more LED's, an embedded display monitor, or the like.

18 Claims, 5 Drawing Sheets

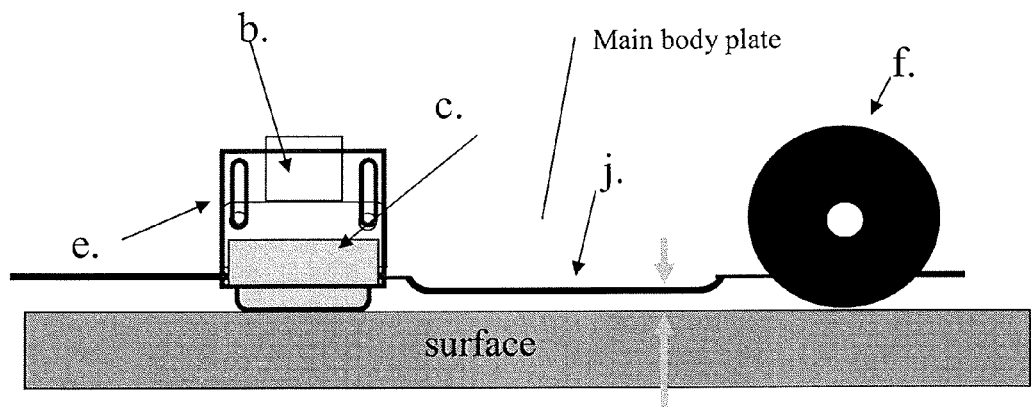
Figure 2: End plate (c.) position, roller (f.) position with respect to surface and main body plate.
.050"
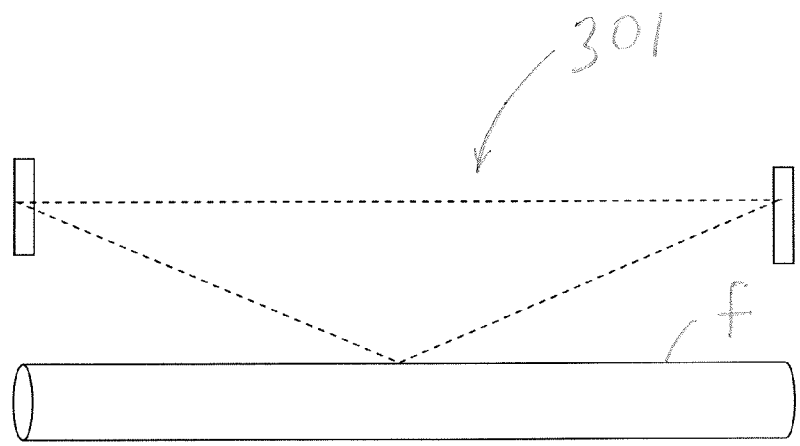
Figure 3: Triangular pattern of roller and two end plates

PORTABLE BAR CODE VERIFICATION READER

PRIORITY CLAIM

The present application claims the benefit of U.S. provisional patent application No. 61/614,707, filed Mar. 23, 2012, which is incorporated by reference in its entirety as if fully set forth herein.

BACKGROUND OF THE INVENTION

1. Technical Field

This invention relates generally to bar code verification technology, and in particular to a method and apparatus for capturing any size bar code, both one-dimensional and two-dimensional bar codes, by using a hand held portable device in one embodiment. In one embodiment, the bar codes may be specifically designed to follow industry standards for bar code verification conformance, such as ISO/IEC 15426-1: 2006(E) and ISO/IEC 15426-2:2005(E).

In one embodiment, the invention may also be designed to snap into a special platform that can be attached to a table-top printer, or the like, and verify the quality of bar code labels as they are being printed.

2. Description of Prior Art

The prior art teaches the use of a video camera, a lens, and a light source combination placed into large enclosures. Portable devices have previously not been possible to make since many bar code labels are greater than 5" wide. This size field of view requires the distance between the lens and the bar code label to be significantly large. Therefore, any portable device would have a large footprint and it would be very difficult to verify labels efficiently with such a configuration. An area camera with a single lens cannot capture both small and large bar code labels without changing the camera and/or the lens.

Another prior art device uses a line scan video camera, a lens and a light source combination placed into a small enclosure. But the process of bar code verification with such a device requires the user to scan 10 different positions across a one-dimensional bar code in order to verify the bar code according to industry standards. This is a very slow process and does not account for any of the scans that might pick up a smear or blemish. A line scan camera system alone cannot read a line of bar code data that does not decode. A line scan camera's ability to accurately verify a bar code depends upon a subjective position across the image, and a line scan camera bar code verification system alone cannot decode or verify any two-dimensional codes, as it lacks vertical resolution.

Bar codes are used in a wide range of applications. But, when a bar code label does not read or does not read the correct data, an avalanche of errors can and will occur causing inventory control issues as well as potentially incorrect pricing. Thus, major retail outlet will penalize the printer with a stiff monetary fine for each and every bar code label that did not work properly.

Bar code verification systems are essential in today's world. Today, many printing companies spot check for bar code quality as a bar code is being printed. Since portable 1D and 2D bar code verification systems do not exist, the printing companies often have to take individual samples of bar code labels from their production line and carry them into their quality inspection rooms, then grade the quality of a bar code label. A portable verification device, as described below according to the teachings of the present invention, would allow them to check bar code quality right on the production line, resulting in a valuable savings of time and effort.

BRIEF DESCRIPTION OF THE DRAWINGS

FIG. 2 depicts the contact image sensor of the present invention in one configuration.

FIG. 3 depicts a sample configuration of a stabilization roller of the present invention.

DETAILED DESCRIPTION OF THE PRESENT INVENTION, IN ONE EMBODIMENT

In one embodiment of the present invention, the user can pull the read head of a portable bar code verification device across a bar code label by using the attached handle. Alternatively, the read head can be snapped into a docking station mounted onto, for example, a printer so that bar code labels can be verified dynamically while the labels are being printed.

While prior art verifiers are limited to grading bar code labels that will fit into their field of view, which is equivalent to the size of their imaging sensor, with the present invention the width of the bar code does not matter. All labels can be scanned down the image (vertically) or across the image (horizontally) making the size of a bar code label generally irrelevant.

In one embodiment of the present invention, a contact image sensor, integrated with a, for example, 660 nm red light source may be used in conjunction with an encoder and a strategically placed stabilization roller. This invention will capture the image of any type and any physical size label (one-dimensional and two-dimensional) and may send the data to a computer. Multiple barcodes may be captured as well. The present invention may read bar codes of varying sizes, such as a bar code label as small as 0.25" (or even smaller) and as large as 12" inches wide (or larger).

Hardware

Figure 1:
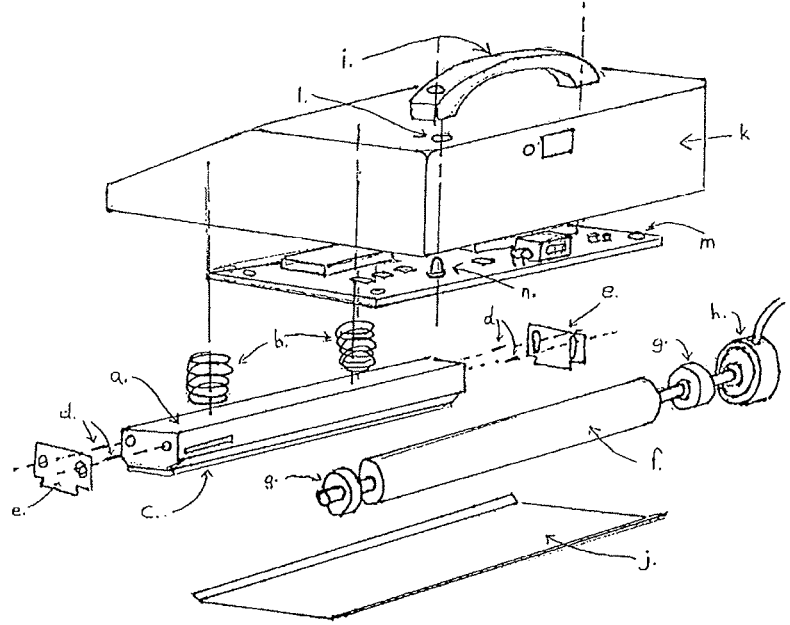
FIG. 1 depicts a contact image sensor (CIS) of the present invention, in one embodiment.

FIG. 1 below shows a Contact Image Sensor (CIS) (element a). This sensor collects the image of a bar code label and converts it into a video signal. In a preferred embodiment, the CIS is positioned in the front of the portable reader and is structured to float across the surface of a bar code (at the focal point) as the user pulls the reader across the label. There may be two springs (elements b) that may be located behind the CIS which effectively create pressure (approx. 16 ounces, in one embodiment) across the surface of the bar code label.

The floating head feature allows the user to scan across an uneven surface, (for instance corrugated cardboard), and still be able to effectively collect the video image. This feature acts similar to an old record player that uses a floating needle and cartridge. The floating head feature allows the user to scan a bar code label without damaging the surface of the bar code label and allows the user to scan across sharp object without destroying the sensor.

The CIS may use a flat window (element c) to protect the sensor's electronics. This flat surface acts to stabilize the depth of focus. The flat surface also may help to create a 45 degree illumination angle from the internal LED's to the label surface, as stipulated in, for example, ISO/IEC 15426-1:2006 (E) and ISO/IEC 15426-2:2005(E), industry standards for bar code verification conformance standard's geometrical arrangement for a light source with respect to the imaging device.

On each side of the CIS may be two alignment pins (elements d). These pins stabilize the up and down motion of the floating CIS head, and also help stabilize the front to back tilt of the CIS head.

To each side of the CIS head may be end plates (elements e). The end plates are designed to hold the pins (elements d) in place and allow for vertical movement of the CIS while minimizing horizontal movement.

The end plates (elements e) are designed to be removed so that the CIS head can easily be replaced and are designed to rest onto the surface of the bar code label being examined. The bottom of these end plates set the maximum surface position of the CIS head.

The end plates (elements e) may, in one embodiment, be made of polytetrafluorethylene or similar material so that the surface friction is minimal.

The end plates (elements e) act as two legs of a triangular support for the entire reader. They may be positioned 0.050" below the main body of the read head. (FIG. 2).

In one embodiment, a stabilization roller may be used (element f), and may be located near the rear of the reader. The stabilization roller may be made of a semi-rigid rubber. When the roller contacts the surface of a bar code, it creates a unique stabilization of the scanning motion. It may be geometrically arranged in a triangular pattern 301 (FIG. 3) with the two end plates (element e). When scanning a bar code, it may be important to control swaying or shifting motions. Without the stabilization roller, the collected image may become terminally distorted.

In one embodiment, the stabilization roller, along with the two end plates (elements e), and CIS are the only parts of the read head structure that make contact with the surface.

The stabilization roller may be positioned 0.050" below the main body of the read head and may use two bearings (elements g) located on each side of the read head. The stabilization roller may also be connected to an encoder (element h).

The encoder (element h) is a device that creates electric pulses that represent forward or reverse motion. For a 400 pixels per inch Contact Image Sensor (CIS), the encoder may be required, in one embodiment, to output 400 pulses per inch. In this way, the CIS can be programmed to scan 400 times per inch. The results will cause a linear image to be created.

In various embodiment, the encoder is attached to the stabilization roller at one end and there is a handle (element i) located on top of the read head. The handle may be geometrically positioned to exert pressure equally between the stabilization roller and the end plates. The bottom base of the read head (element j) may be recessed by 0.100 from the surface of a bar code label. It may also be beveled on each side to minimize contact with potentially raised edges of die cut bar code labels. The upper housing (element k) may be used to cover the mechanical structure, and the upper housing holds the handle (element i).

In further embodiments, the upper housing (element k) has an orifice (element l) which allows the Grade Quality LED Indicator (element n) located on the main electronic circuit board (element m) to be seen by the user. All processing for creating a video image may be performed on the main electronic circuit board (element m) located inside the read head, or may be performed in a variety of other ways.

In further embodiments, the entire hand held structure may also be placed onto a special platform that is mounted to a printer so that bar code verification can be performed dynamically as the bar code labels are being printed. When necessary, the hand held structure can be removed and used statically to grade bar codes. The removal and mounting of the device may also use a "snap-in-place" structure so it is easy to grade the quality of bar code labels both statically or dynamically.

In different embodiments, the hand held verification reader of the present invention may have a dedicated computer inside to give the user more verification data. The hand held verification reader of the present invention may use a SIM card to save images to be downloaded later, for additional verification analysis. Further, the hand held verification reader of the present invention may use a memory stick (thumb drive) to save images to be downloaded later for additional verification analysis.

In various embodiments, the hand held verification reader of the present invention may incorporate a monitor that displays additional verification data. The hand held verification reader of the present invention may also transmit video data via the Internet, Wi-Fi, Bluetooth, or another communication medium to a local PC for further verification analysis and data storage.

In further embodiments, the hand held verification reader of the present invention may be used to read and qualify Braille according to industry standards In one embodiment, the hand held verification reader of the present invention may incorporate a battery pack for portable verification.

Electronic Architecture

Figure 4:
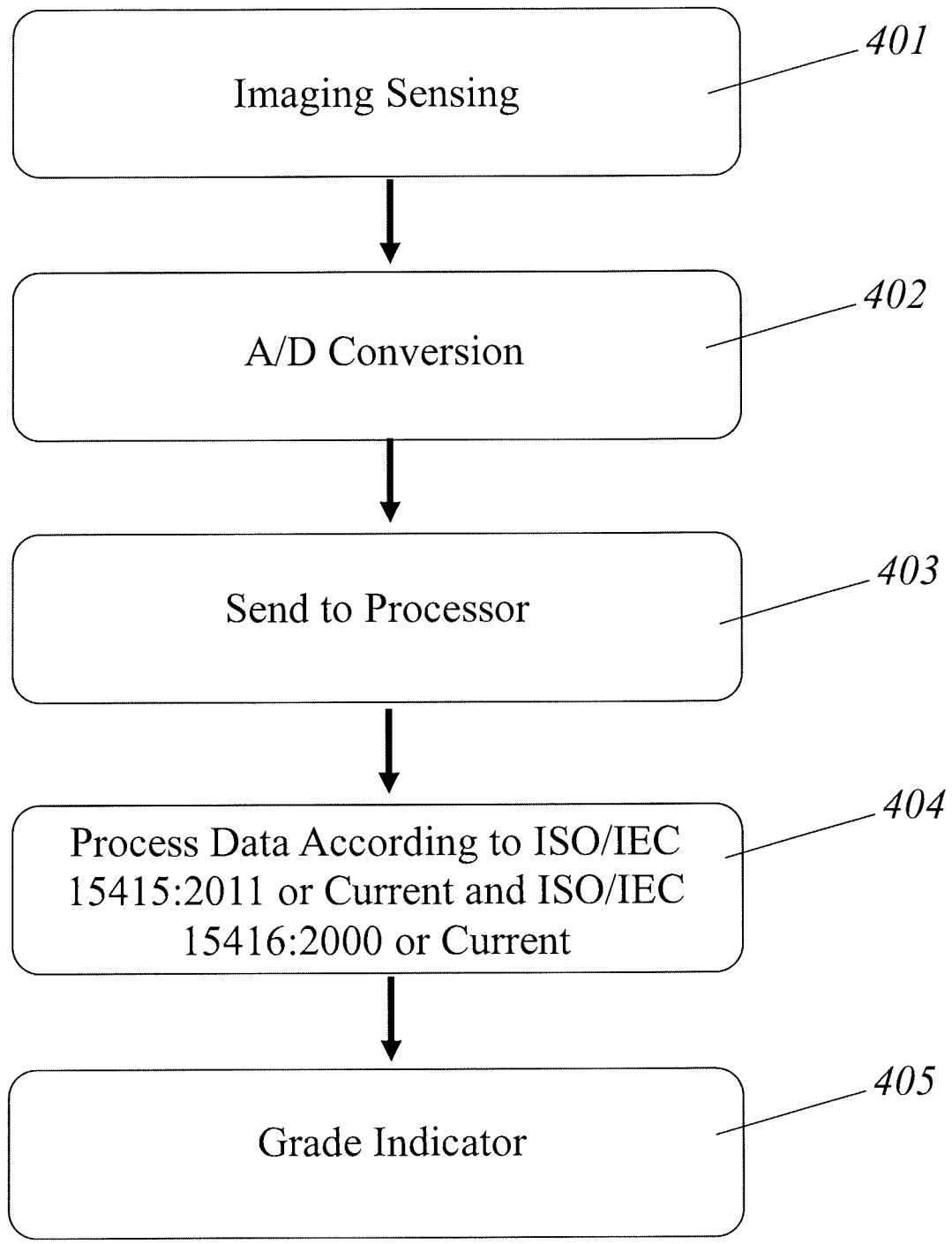
FIG. 4 depicts a flow diagram that may be used with the present invention.

The electronic architecture of the present invention now will be described more fully hereinafter with reference to the block diagrams of FIGS. 5 and 6, as well as the flow diagram of FIG. 4. The invention provides an electronic architecture for image acquisition which is suitable for barcode verification. Specifically, the present invention may process the analog video signal of a contact image sensor 501 and format the data for, for example, USB 2.0 or 3.0 isochronous transfer. In one embodiment of the invention (FIG. 5), the resulting USB video data may be made available for a Windows PC 503 running the Lumenera Corporation USB drivers for Windows. In another embodiment of the invention (FIG. 6), the resulting USB video data is made available for a PC (603) running the GNU USB driver libusb in a Windows operating system.

Figure 5:
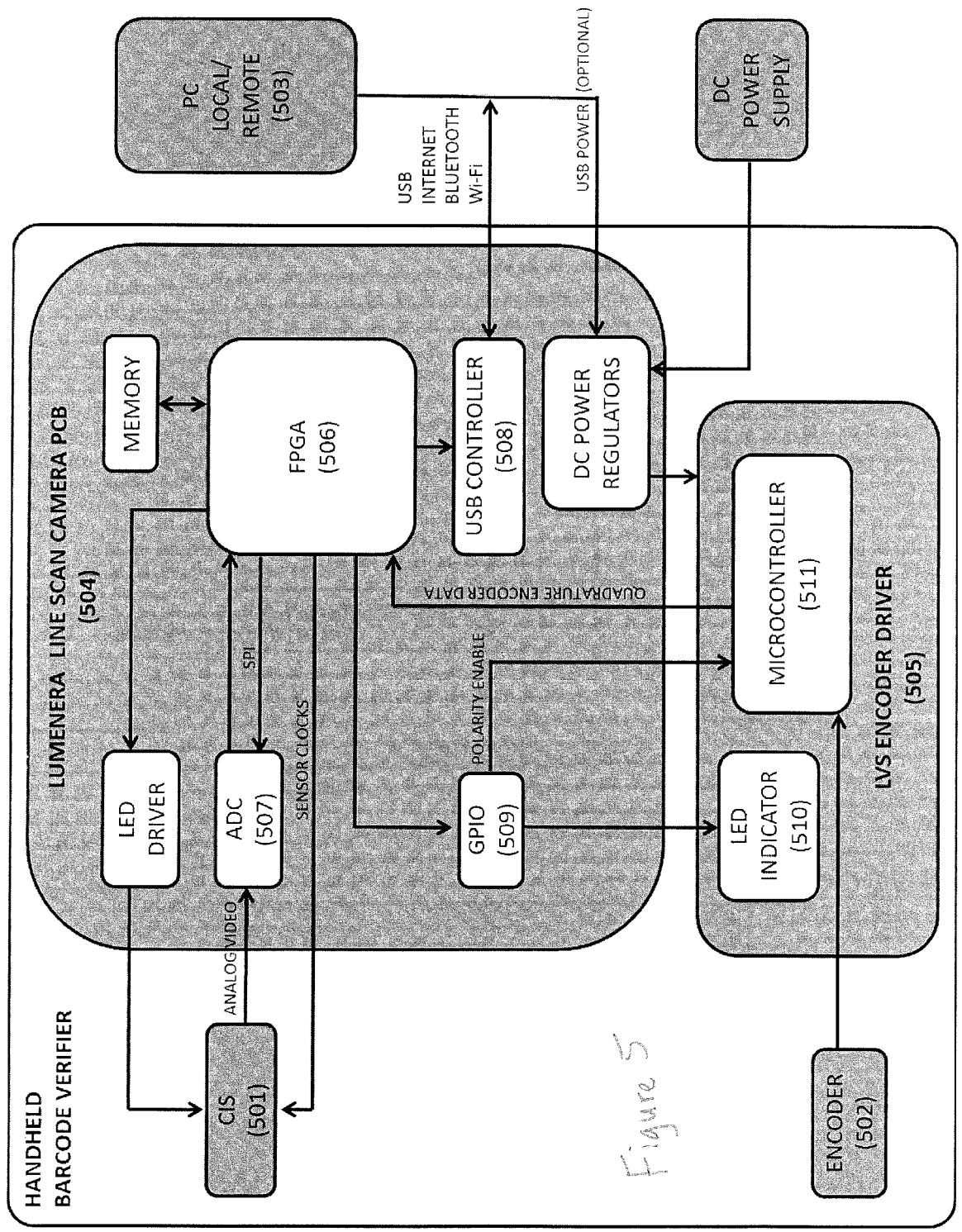
FIGS. 5 and 6 depict the electronic architecture of the barcode verifier of the present invention, in different embodiments

In one embodiment of the present invention, with reference to FIG. 5, the image acquisition process is driven by a line scan camera circuit board 504 designed and manufactured by the Lumenera Corporation. The Lumenera camera board interfaces directly to a contact image sensor (CIS) 501 and to a second circuit board designed by Label Vision Systems (encoder driver circuit board 505), which relays positional information to the Lumenera camera board by processing the quadrature pulses of an incremental encoder 502.

The resolution of the CIS 501 may, in one embodiment, be high enough to follow industry standards for bar code verification. For example, a 400 ppi sensor is qualified to read one-dimensional code as small as 7 mils×dim and a two-dimensional code as small as 12 mil×dim.

As shown in FIG. 5 (and the flow diagram of FIG. 4), an FPGA 506 in the Lumenera camera board may drive the entire image acquisition logic. In one embodiment, the FPGA 506 clocks the contact image sensor (CIS) 501 up to a maximum frequency of 4800 lines per second, the LEDs in the CIS 501 are turned on while a line is being scanned, and remain off when idle (step 401). In step 402, the resulting analog video output is passed to an analog-to-digital converter (ADC) 507, which presents the digital data to the FPGA 506. In step 403, the FPGA 506 stores the digital data in memory and subsequently passes it to the USB controller 508 for USB transfer. In step 404, on the receiving end 503, an application running the Lumenera Corporation USB drivers and library can process the data as streaming video. In one embodiment, the converted digital image is processed against the Symbology Specification to determine the code, and decodes it for processing against the requirements, as defined in ISO 15415 or 15416.

The FPGA 506 can activate the general purpose I/O's (GPIO) 509 and adjust the gain in the ADC 507 at any given time in response to a command given to the FPGA 506 by the PC application (at 503). These commands are described in the Lumenera's API (Application Programming Interface). In step 405, the GPIO's 509 are used to activate the LED indicator 510 and to control the encoder 502 polarity. The quadrature encoder pulses are processed and sampled by a microcontroller 511 in the circuit board. They are then relayed to the Lumenera camera board 504 and used to clock the CIS 501.

Figure 6:
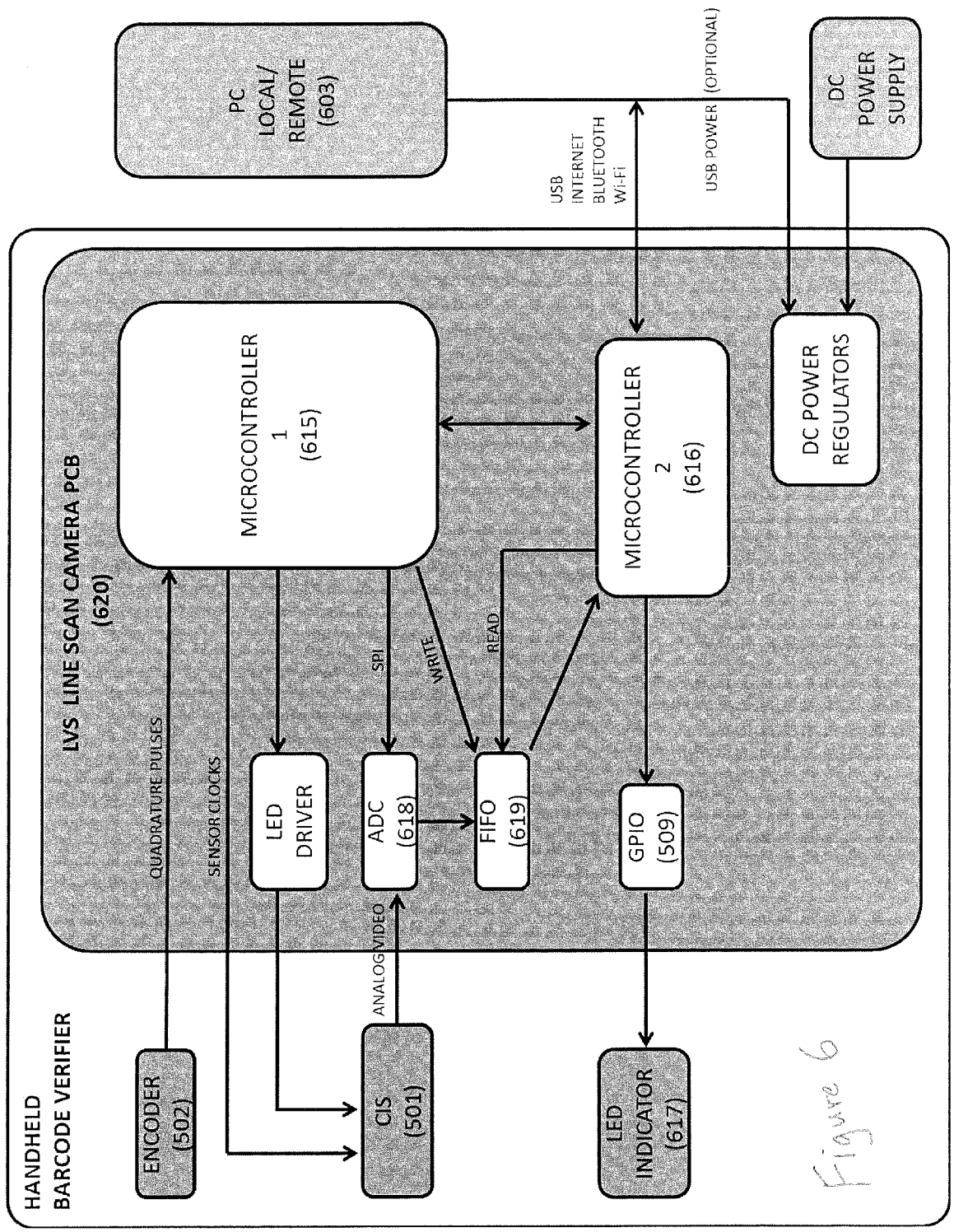

In one embodiment of the present invention, with reference to FIG. 6, two microprocessors 615 and 616 run the image acquisition logic. One microprocessor 615 controls the interface to the encoder 502 and CIS 501 while the other microprocessor 616 processes the video data and sends it to a Windows PC 603 over USB protocol.

One microprocessor 615 processes the encoder signals for motion control and respectively clocks the CIS 501 and accompanying LEDs 617. This microprocessor 615 also provides the control signals to the ADC 618 and the write clock for the FIFO 619. A second microprocessor 616 provides the read clock to the FIFO 619, collects the digital data and processes it for asynchronous USB transmission using the built-in USB host controller. This processor 616 also controls the LED indicator 617 in response to commands sent by the PC application (at 603), which communicates to the camera board 620 via the GNU USB driver libusb. Through this interface, the PC application (at 603) also sends commands to control the gain in the ADC 618 and sets up the encoder polarity.

The present invention has the option to be powered via USB power, by an external power supply, or any other suitable source.

The present invention has been described above with respect to various embodiments-both in hardware and in software. It will be appreciated by one of ordinary skill in the art that these are just sample embodiments, and that other suitable embodiments may also be used.

What is claimed is:

1. A bar code verification device comprising:
   a. a sensor for moving relative to a surface of a bar code and for capturing a signal corresponding to the bar code, wherein the sensor is positioned within a floating head so as to maintain contact between the sensor and the surface of the bar code; and
   b. a processor for receiving the signal from the sensor, and for:
      i. determining the quality of the bar code associated with the captured signal, and
      ii. displaying an indicator associated with the quality of the bar code.

2. The bar code verification device of claim 1, further comprising a light-emitting device coupled to the processor for displaying the indicator.

3. The bar code verification device of claim 1, wherein the sensor maintains pressure against the surface of the bar code.

4. The bar code verification device of claim 1, further comprising a stabilization roller to stabilize the sensor as it moves across the surface of the bar code.

5. The bar code verification device of claim 4, wherein the stabilization roller comprises semi-rigid rubber.

6. The bar code verification device of claim 1, wherein the signal is a video signal.

7. The bar code verification device of claim 1, wherein the sensor is part of a portable reader that may be moved relative to the surface of the bar code.

8. The bar code verification device of claim 1, wherein the sensor is held stationary while a printed surface containing one or more bar codes is moved relative to the sensor.

9. The bar code verification device of claim 1, wherein the sensor and the processor communicate via a communication medium selected from the group consisting of the Internet, Wi-Fi and Bluetooth.

10. A bar code verification process, comprising the steps of:
   a. moving a sensor relative to a surface of a bar code, wherein the sensor is positioned within a floating head so as to maintain contact between the sensor and the surface of the bar code;
   b. capturing by the sensor a signal corresponding to the bar code;
   c. determining the quality of the bar code associated with the captured signal; and
   d. displaying an indicator associated with the quality of the bar code.

11. The process of claim 10, wherein the displaying step comprises displaying the indicator using a light-emitting device.

12. The process of claim 10, wherein the sensor maintains pressure against the surface of the bar code.

13. The process of claim 10, further comprising the initial step of positioning a stabilization roller to stabilize the sensor as it moves across the surface of the bar code.

14. The process of claim 13, wherein the stabilization roller comprises semi-rigid rubber.

15. The process of claim 10, wherein the signal is a video signal.

16. The process of claim 10, wherein the sensor is part of a portable reader that may be moved relative to the surface of the bar code.

17. The process of claim 10, wherein the sensor is held stationary while a printed surface containing one or more bar codes is moved relative to the sensor.

18. The process of claim 10, wherein the sensor and the processor communicate via a communication medium selected from the group consisting of the Internet, Wi-Fi and Bluetooth.

* * * * *